United States Patent
Cavanagh

(10) Patent No.: US 6,883,390 B1
(45) Date of Patent: Apr. 26, 2005

(54) INSTRUMENT FOR MEASURING WATER-SPRAY BLAST FORCE

(75) Inventor: Richard A. Cavanagh, Panama City, FL (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 10/738,333

(22) Filed: Dec. 18, 2003

(51) Int. Cl.$^7$ .............................. G01F 1/46; G01W 1/00
(52) U.S. Cl. .................................. 73/861.65; 73/170.21
(58) Field of Search ......................... 73/861.65, 170.17, 73/170.21

(56) References Cited

U.S. PATENT DOCUMENTS 5,415,049 A * 5/1995 Takami et al. ........... 73/861.42

* cited by examiner

Primary Examiner—Harshad Patel
(74) Attorney, Agent, or Firm—James T. Shepherd

(57) ABSTRACT

A system measures dynamic force of an impacting spray of air and water. A pitot-tube section is aligned to receive a longitudinal flow of impacting air/water spray in a laterally extending orifice. A first differential pressure transducer is coupled to the pitot-tube section for producing signals representative of velocity of the air/water spray at the orifice. A rain gage section adjacent to the pitot-tube section receives and collects volumes of water of the longitudinal flow of air/water spray through a laterally extending opening. A second pressure differential transducer is coupled to the rain gage section to produce signals representative of the volumes of water collected in the rain gage section. A computer-based control/readout module receives the velocity representative signals and water volume representative signals for indicating the magnitude of dynamic force attributed to impacting air/water spray in the opening.

20 Claims, 1 Drawing Sheet

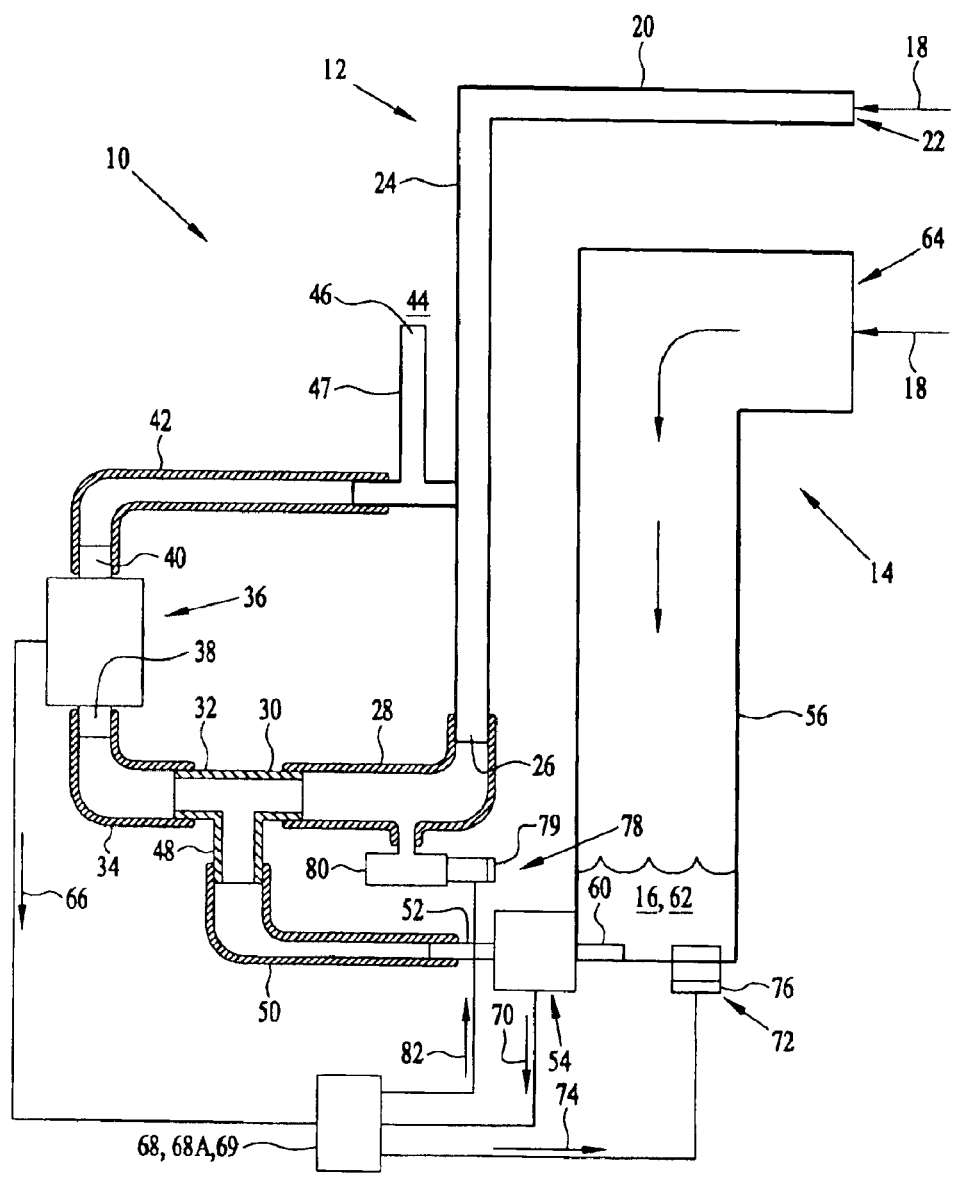

INSTRUMENT FOR MEASURING WATER-SPRAY BLAST FORCE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to devices providing indications of dynamic force. More particularly, this invention relates to instrumentation for measuring the dynamic force imparted by water/air spray on a landing craft air cushion (LCAC) during high-speed transit over the water.

High speed transit over water by LCACs exposes superstructure and equipment on deck to high-velocity sprays of water in the relatively fast moving air-stream. The forces created by the impacting air and water-spray acting on materials and equipment on deck can tear lines and other securing mechanisms apart, and the unsecured or loose materials and equipment can be swept over the side, can injure crewmembers, and cause significant damage to the LCAC.

If the forces created by the water/air spray could be determined or predicted under a variety of conditions, then sufficient means for securing the equipment stored on-deck could be installed and design criteria would be available for further equipment or modifications to existing equipment. However, there are no prior known methods to measure the dynamic impact of a water/air spray because there has been no way to determine the relative percentages of the two densities. Prior studies regarding loading on an underway LCAC assumed the loading created by wind only, and the studies did not take into account the fact that a significant majority of the dynamically impacting flow was comprised of water which has a density around 1,000 times that of air. When a soft-topped vehicle such as an LCAC is hit with 50 to 100 mph spray, the percentage of water content plays a significant part in the loading experienced by the structure and is too great to be ignored.

Thus, in accordance with this inventive concept, a need has been recognized in the state of the art for instrumentation for measuring the dynamic force imparted by water/air spray on an LCAC during high-speed transit over the water.

OBJECTS AND SUMMARY OF THE INVENTION

An object of the invention is to provide a system to determine dynamic loading on a high speed marine vessel such as an LCAC.

Another object of the invention is to provide a system for determining dynamic loading attributed to air/water spray on a high speed marine craft.

Another object of the invention is to provide a system to determine dynamic loading attributed to air/water spray for predicting fuel consumption and range of a high speed marine craft.

Another object of the invention is to provide a system to determine dynamic loading including destabilizing levels of dynamic loading attributed to air/water spray on equipment and superstructure extending above the deck on a high speed marine craft.

Another object of the invention is to provide a system to determine dynamic loading attributed to air/water spray on equipment and superstructure in virtually real-time to apprise personnel of dangerous conditions of exposure on deck of a high speed marine craft.

Another object of the invention is to provide a system to determine dynamic loading attributed to air/water spray in virtually real-time on a high speed marine craft during changing ambient conditions.

Another object of the invention is to provide a system to determine the loading imparted by heavy weather, such as hurricanes and thunderstorms, on buildings, tents, windows, piers, marine vessels, and other structures and vehicles.

These and other objects of the invention will become more readily apparent from the ensuing specification when taken in conjunction with the appended claims.

Accordingly, the present invention is to create a system for measuring dynamic force created by a combination of impacting flowing air and water spray. A pitot-tube section is aligned to receive a longitudinal flow of impacting air/water spray in a laterally extending orifice. A first differential pressure transducer is coupled to the pitot-tube section for producing signals representative of velocity of the air/water spray at the orifice. A rain gage section adjacent to the pitot-tube section receives and collects volumes of water of the longitudinal flow of air/water spray through a laterally extending opening. A second pressure differential transducer is coupled to the rain gage section to produce signals representative of the volumes of water collected in the rain gage section. A computer-based control/readout module receives the velocity representative signals and water volume representative signals for indicating the magnitude of dynamic force attributed to impacting air/water spray in the opening. The pitot-tube section has orthogonally interconnected first and second lengths of rigid tubing, and the rain gage section has orthogonally interconnected horizontal and vertical capture tubes. The first rigid tubing is aligned with the longitudinal flow of the air/water spray to face the orifice laterally extending across the longitudinal flow of the air/water spray. The first differential pressure transducer is coupled to the second rigid tubing for producing the velocity representative signals. The horizontal capture tube is aligned with the longitudinal flow of the air/water spray to face the opening laterally extending across the longitudinal flow of the air/water spray to receive and collect water of the air/water spray. The second pressure differential transducer is coupled to the vertical capture tube for producing the water volume representative signals. The first pressure differential transducer produces the velocity representative signals corresponding to pressure at the orifice, and the second pressure differential transducer produces the water volume representative signals corresponding to pressure in the vertical pressure tube.

BRIEF DESCRIPTION OF THE DRAWINGS

The FIGURE is a schematic diagram of measuring system of the invention for determining dynamic forces attributed to air/water spray on equipment and superstructure on high speed marine craft like LCACs.

DESCRIPTION OF THE PREFERRED EMBODIMENTS

Referring to the FIGURE, measuring system 10 of the invention provides an indication of the dynamic impacting forces created by a combination of flowing air and water spray. This information is useful in the design and operation of high speed marine craft, such as landing craft air-cushion (LCAC) since they create dynamic loading that must be considered when determining fuel consumption, dynamic stability, and reliable securing of equipment on the LCAC deck.

Measuring system 10 has a pitot-tube section 12 in combination with a rain-gage section 14 to measure velocity of and percentage or amount of water 16 in impacting spray (shown as arrows 18), respectively. Air/water spray 18 can be attributed to any number of factors associated with high speed propulsion of watercraft such as LCACs in different sea states and wind conditions or other sources of spray such as wind-driven rain. Air/water spray 18 can be regarded as an essentially horizontally directed dynamic flow over the deck that can impact superstructure and equipment to create unwanted dynamic loadings and significantly decrease efficiency.

Pitot-tube section 12 is made in accordance with well known designs of such instrumentation that measure the total static and dynamic pressures in an air stream to indicate the velocity of the stream of air/water spray 18. Pitot-tube section 12 has a first length of rigid tubing 20 aligned with flowing air/water spray 18 and receives air/water spray 18 through an orifice 22 that laterally extends across and faces into the path of incoming air/water spray 18 to receive air/water spray 18. First rigid tubing 20 is connected to a second length of rigid tubing 24 that orthogonally extends in a right angle from first tubing 20 to an open end 26.

First and second tubing 20 and 24 can be made in different lengths from any one of a number of rigid metal or plastic-like materials that are rugged and non-corrosive to bear up in the harsh marine environment. First and second tubing 20 and 24 can have outer diameters in the neighborhood of about five sixteenth inches and inner diameters of about one eighth inches. A typical commercially available stainless steel pitot tube structure that could be used for pitot-tube section 12 could be one of the 160 Series manufactured by Dwyer Instruments Inc., 102 Indiana Highway 212, Michigan City, Ind. 46361-0373.

A length of flexible tubing 28 is fitted over open end 26 of second tubing 24 and extends to a first part 30 of a T-shaped hollow fitting 32 having another length of flexible tubing 34 connected to an air differential pressure transducer 36 at one inlet 38. Air differential pressure transducer 36 has another inlet 40 connected to another length of flexible tubing 42 joined to a static port tube that extends to receive static or ambient pressure 44 at a static port 46 in static port portion 47 adjacent to second tubing 24 of pitot-tube section 12. T-shaped hollow fitting 32 has a third part 48 connected to another length of flexible tubing 50 that is connected to a tube-like coupling 52 of a water differential pressure transducer 54.

Rain gage section 14 has a vertical spray capture tube 56 closed at its lower end and orthogonally extending at its opposite end through a right angle transition into a horizontal portion to receive and collect water of spray 18. The horizontal portion of spray capture tube 56 of rain gage section 14 extends along side of and is parallel to second rigid tubing 20 of pitot-tube section 12. Water differential pressure transducer 54 is mounted on spray capture tube 56 and has a tube-like coupling inlet 60 extending into a reservoir 62 in spray capture tube 56. The horizontal portion of spray capture tube 56 can have an inner radius of about 0.975 inches, for example, and has a coextensive opening 64 at its end that laterally extends across and faces the path of longitudinal flow of impacting air/water spray 18. Second length of rigid tubing 24 of pitot-tube section 12 can be connected to vertical spray capture tube 56 of rain gage section 14 to assure that opening 64 is positioned to be essentially next to and along side of orifice 22 and laterally extends across and faces the longitudinal path of incoming air/water spray 18 to receive and collect water spray 18 through it.

Air differential pressure transducer 36 could be a precision manometer and air pressure gage that are also manufactured by Dwyer Instruments Inc. and appropriately connected to pitot-tube section 12. Another commercially available manometer or differential pressure sensor for air differential pressure transducer 36 could be one of the PX-26 series of wet/wet differential pressure sensors manufactured by Omega Engineering Inc., One Omega Drive, Stamford, Conn. 06907-1660. Transducer 36 generates a signal (shown as arrow 66) that is representative of (or corresponds to) the velocity of spray 18 and is based on the pressure differential between the pressure of spray 18 at orifice 22 of rigid tubing 20 and ambient or static pressure 44 at static port 46. The pressure of spray 18 at orifice 22 is virtually the same as the pressure sensed at open end 26 of rigid tubing 24. Transducer 36 couples representative signal 66 to a computer-based control/readout module 68 having a general purpose computer 68A for further processing and/or visual indication of velocity of spray 18 on a visual readout 69, such as a monitor screen.

Water differential pressure transducer 54 could be one of the PX-26 series of wet/wet differential pressure sensors manufactured by Omega Engineering Inc. Water differential pressure transducer 54 generates a signal (shown as arrow 70) that is representative of (or corresponds to) the amount or volume of water 16 in reservoir 62 in spray capture tube 56. Signal 70 is based on the pressure differential between the pressure of water 16 at tube-like coupling 60 of transducer 54 and the pressure of spray 18 at open end 26 of rigid tubing 24. Transducer 54 couples signal 70 to computer 68A of computer-based control/readout module 68 for further processing and/or a visual indication on readout 69 that shows the amount of water 16 captured during a predetermined period in capture tube 56.

A first purge valve mechanism 72 is mounted on vertical spray capture tube 56 to selectively purge the amount of water 16 that has been accumulated in reservoir 62. Purge valve mechanism 72 is connected to computer-based control/readout module 68 to be actuated by a control signal (shown as arrow 74) from module 68 to initiate purging of water 16 to ambient and can include a small pump 76 if desired to speed up the purging process. Control signal 74 can be produced periodically by module 68 after one or more predetermined sampling periods have elapsed or at the beginning of a new sampling sequence.

A second purge valve mechanism 78 can be mounted on a sump 80 at the bottom of second length of rigid tubing 24 to selectively purge any water of spray 18 that may have accumulated in tubing 28 and/or second tubing 24 during a sampling period. Second purge valve mechanism 78 is connected to module 68 for actuation by a control signal (shown as arrow 82) to initiate purging into the ambient and can include a small pump 79 to speed up purging of sump 80. Control signal 82 can be produced periodically by module 68 to clear sump 80 after each or a number of sampling periods for determining velocities have elapsed, or to clear sump 80 at the beginning of a new sampling sequence.

From the measurements of velocity in pitot-tube section 12 and of volume of water in rain gage section 14, system 10 of the invention can provide readings representative of dynamic loadings of the high speed craft such as an LCAC at different speeds in different ambient conditions. System 10 can be securely mounted on the exposed deck of an LCAC where dynamic loadings attributed to fast moving air/water spray 18 are likely to be problematical, i.e., where the fast moving spray 18 would impact superstructure and equipment above deck level. First rigid tube 20 of pitot-tube section 12 and the horizontal section of spray capture tube 56 of rain gage section 14 are aligned with the direction of impacting air/water spray 18 to respectively orient orifice 22 and opening 64 to laterally extend to face across the path or flow of impacting air/water spray 18.

Pitot-tube section 12 allows transducer 36 to measure the differential air pressure between the dynamic pressure at orifice 22 at open end 26 of second tube 24 and static, ambient pressure 44 at static port 46. Transducer 36 provides a signal 66 representative of the velocity V of the medium (impacting air/water spray 18) and connects this signal to module 68. An assumption will be made that the water component of air/water spray 18 is traveling at the same velocity as the air component. In time, water collected in pitot-tube section 12 may clog second rigid tubing 24 and/or flexible tubing 28, but this possibility will be evident from the readings at module 68; however, before this happens, the interconnected sump 80 can be drained via an appropriate control signal 82 to second pump valve mechanism 78. The velocity V of impacting air/water spray 18 can be determined for each second or periodically as often as desired and averaged if desired in computer-based control/readout module 68.

When the velocity V of impacting air/water spray 18 is determined, rain gage section 14 can help provide other information needed to determine the amount of the dynamic impacting force attributed to air/water spray 18. The dynamic force experienced by an object in the flow field is:

$$F = \tfrac{1}{2}\rho V^2$$

However, the density $\rho$ in the equation is the density of the medium of air/water spray 18 which the above-deck structure and equipment of the LCAC is exposed to. The densities of the constituents are: $\rho_{air}$=0.002377 slugs/ft$^3$, $\rho_{sea\ water}$=2 slugs/ft$^3$, and $\rho_{fresh\ water}$=1.94 slugs/ft$^3$.

The dynamic force experienced would be:

$$F = \tfrac{1}{2}\rho V^2 = \tfrac{1}{2}(\%_{water} * \rho_{water} + \%_{air} * \rho_{air}) V^2,$$

where $\rho_{water}$=the density of sea water (2 slugs/ft$^3$) and $\rho_{air}$=the density of air (0.002377 slugs/ft$^3$) in a salt water environment.

Determination of the relative percentages can be provided in computer-based control/readout 68 coupled to receive signals 70 representative of the volume of water 16 that has accumulated in rain gage section 14. Since opening 64 of spray capture tube 56 can have a known diameter of about 0.975 inches, for example, the area of opening $64 = \pi r^2 = \pi (0.975)^2 = 2.9865$ in$^2$. So, if the velocity of the flow is V and is known, the data representative of successive accumulated amounts of water 16 of air/water spray 18 in reservoir 62 can be recorded every second. Accordingly, for each second, rain gage section 14 will have "captured" a volume of water spray $V_{ws}$:

$$V_{ws} = V(\text{in inches/sec}) * 1\text{sec} * 2.9865 \text{ in}^2 = 2.9865 V \text{ in}^3.$$

During each second that $V_{ws}$ is captured, water differential pressure gage 54 at the bottom of vertical spray capture tube 56 would have seen or indicated (via representative signals 70) a change $\Delta$ in the height h of water 16 inside of vertical spray capture tube 56. The quantity $\Delta$h would have been indicated as a change $\Delta$ of pressure P, ($\Delta$P) from water differential pressure gage 54. The "capturing intervals" can vary from the exemplary one second to other durations as needed for determinations of acceptable reliability of relative air/water determinations for air/water spray 18.

If, for example, the inside radius of the PVC tube of vertical spray capture tube 56 is 0.796 inches, the cross sectional area is 1.9906 in$^2$. During the one second capture period, then, the volume of water actually collected $V_{wc}$ would be 1.9906*$\Delta$h in$^3$.

The percentage of water in the flow would then be:

$$\%_{water} = V_{WC} / V_{WS}, \text{ or}$$

$$\%_{water} = 1.9906 \, \Delta h \text{ in}^3 / 2.9865 \, V \text{ in}^3$$

where $\Delta$h is provided by water differential pressure transducer 54 at the bottom of vertical spray capture tube 56 of rain gage section 14, and V (velocity of air/water spray 18) is provided by the air differential pressure transducer 36 connected to second rigid tubing 34 of pitot-tube section 12.

The percentage of air in air/water spray 18 would simply be that portion of spray 18 that isn't water, i.e.:

$$100\% - \%_{water} = \%_{air}.$$

Therefore, the dynamic force $F_{dynamic}$ across the area of opening 64 of rain gage section 14 would be given by:

$$F_{dynamic} = \tfrac{1}{2}\rho V^2 = \tfrac{1}{2}(\%_{water} * \rho_{water} + \%_{air} * \rho_{air}) V^2$$

and inserting the values for $\rho$ gives:

$$F_{dynamic} = \tfrac{1}{2}(\%_{water} * 2\text{slugs/ft}^3 + \%_{air} * 0.002377 \text{ slugs/ft}^3) V^2.$$

Filling in the values for the two percentages will provide complete information for solution of the equation for the area of opening 64. Next, by simply multiplying the value obtained for $F_{dynamic}$ times the total area of the LCAC that is exposed above-deck to impacting air/water spray 18 (including superstructure and on deck equipment), a realistic value for the total dynamic loading for the LCAC can be arrived at.

The capability for computing this total dynamic loading could be provided by computer-based control/readout module 68 to give accurate real-time predictions regarding deck loading conditions of equipment on the LCAC during changing ambient conditions, for example, to a real-time loading solution. In accordance with well known programming skills by one of ordinary skill in the art, a general purpose computer 68A of module 68 can be programmed to receive and appropriately process data representative of the dimensions of orifice 22 of pitot-tube section 12 and the inside radius of the PVC tube of vertical spray capture tube 56 of rain gage section 14. In accordance with well known programming skills by one of ordinary skill in the art, computer 68A of module 68 can be programmed to receive and appropriately process data representative of the magnitudes of signals 66 representative of velocity V of impacting air/water spray 18 in pitot-tube section 12 and signals 70 representative of volume and/or height ($\Delta$h) of water 16 in rain gage section 14. In accordance with well known programming skills by one of ordinary skill in the art, computer 68A of module 68 can be programmed to compute the quantities of F, $V_{ws}$, $V_{WC}$, $\%_{water}$, $\%_{air}$, and $F_{dynamic}$ of the equations, supra.

Another useful application of dynamic force measuring system 10 would be to predict potentially destabilizing effects of carrying some bulky items of equipment such as a radar dome and its associated support modules, for example, on the LCAC. Since these items can create a large area high above the deck that would be reactive to air/water spray 18, system 10 can be mounted on a framework at a location above the deck that corresponds to where the dome and modules might be secured. After simulating the potential dynamic loading by system 10, operators of the LCAC are more realistically apprised of the potential dangers involved to enable a more informed decision re the transport of such bulky items. Having the teachings of this invention in mind, modifications and alternate embodiments of dynamic force measuring system 10 may be adapted without departing from the scope of the invention. Its uncomplicated, compact design that incorporates structures long proven to operate successfully lends itself to numerous modifications to permit its reliable use in hostile and demanding marine environments. Dynamic force measuring system 10 can be made larger or smaller in different shapes and fabricated from a wide variety of materials to assure resistance to corrosion and long term reliable operation under a multitude of different operational conditions and requirements.

The disclosed components and their arrangements as disclosed herein, all contribute to the novel features of this invention. Dynamic force measuring system 10 provides a multipurpose and capable means of rapidly determining dynamic loading of structures above deck and exposed to air/water spray 18 on high speed marine craft. Therefore, dynamic force measuring system 10, as disclosed herein is not to be construed as limiting, but rather, is intended to be demonstrative of this inventive concept.

It should be readily understood that many modifications and variations of the present invention are possible within the purview of the claimed invention. It is to be understood that within the scope of the appended claims the invention may be practiced otherwise than as specifically described.

I claim:

1. A system for measuring dynamic force of impacting air/water spray comprising:
    a pitot-tube section being aligned to receive a longitudinal flow of an impacting spray of air and water in a laterally extending orifice; a first differential pressure transducer being coupled to said pitot-tube section for producing signals representative of velocity of said air/water spray at said orifice;
    a rain gage section adjacent to said pitot-tube section, said rain gage section receiving and collecting volumes of water of said longitudinal flow of said air/water spray through a laterally extending opening;
    a second pressure differential transducer coupled to said rain gage section for producing signals representative of said volumes of water collected in said rain gage section; and
    a computer-based control/readout module connected to receive said velocity representative signals and said water volume representative signals for indicating the magnitude of dynamic force attributed to impacting air/water spray in said opening.

2. The system of claim 1 wherein said pitot-tube section has orthogonally interconnected first and second lengths of rigid tubing, and said rain gage section has orthogonally interconnected horizontal and vertical capture tubes.

3. The system of claim 2 wherein said first rigid tubing is aligned with said longitudinal flow of said air/water spray to face said orifice laterally extending across said longitudinal flow of said air/water spray, and said first differential pressure transducer is coupled to said second rigid tubing for producing said velocity representative signals.

4. The system of claim 3 wherein said horizontal capture tube is aligned with said longitudinal flow of said air/water spray to face said opening laterally extending across said longitudinal flow of said air/water spray to receive and collect water of said air/water spray, said second pressure differential transducer is coupled to said vertical capture tube for producing said water volume representative signals.

5. The system of claim 4 wherein said first pressure differential transducer produces said velocity representative signals corresponding to pressure at said orifice, said second pressure differential transducer produces said water volume representative signals corresponding to pressure in said vertical pressure tube.

6. The system of claim 5 wherein said first and second differential pressure transducers are coupled to receive static ambient pressure.

7. The system of claim 6 further comprising:
    a first purge valve connected to said second rigid tubing and said module to receive said first control purge signal for selectively purging water from said pitot-tube section; and
    a second purge valve connected to said vertical spray capture tube and said module to receive said second control purge signal for selectively purging collected water volumes from said rain gage section.

8. The system of claim 7 wherein said computer-based control/readout module selectively produces first and second control purge signals, said first and second purge signals being selectively coupled to said first and second purge valves, respectively.

9. The system of claim 8 wherein said first control purge signal are coupled to said first purge valve for selectively purging water from said pitot-tube section, said second control purge signals are coupled to said second purge valve connected for selectively purging collected water volumes from said rain gage section.

10. The system of claim 9 further comprising:
    a pump in said first purge valve to speed up purging of water from said pitot-tube section; and
    a pump in said second purge valve to speed up purging of water from said rain gage section.

11. The system of claim 10 further comprising:
    lengths of flexible tubing connecting said first and second differential pressure transducers to said static ambient pressure.

12. A system for measuring dynamic force of impacting air/water spray comprising:
    means for determining velocity of an impacting spray of air and water, said air/water spray velocity determining means being aligned with the longitudinal flow of said air/water spray, having an laterally extending orifice receiving said air/water spray, and having a first differential pressure transducer for producing a signal representative of velocity of said air/water spray at said orifice;
    means adjacent said air/water spray velocity determining means for collecting at least one volume of water, said water volume collecting means being aligned with the longitudinal flow of said air/water spray, having a laterally extending opening to receive and collect water of said air/water spray, and having a second differential pressure transducer for producing a signal representative of a collected volume of water of said air/water spray; and means connected to receive said velocity representative signal from said air/water spray velocity determining means and said water volume representative signal from said water volume collecting means for producing an indication of the magnitude of impacting dynamic force produced.

13. The system of claim 11 further comprising:

means connected to said air/water spray velocity determining means and said indication producing means for selectively purging any water from said air/water spray that might have collected in said air/water spray velocity determining means; and means connected to said water volume collecting means and said indication producing means for selectively purging said collected volume of water from said water volume collecting means.

14. A method of measuring dynamic force of impacting air/water spray comprising the steps of:

receiving a longitudinal flow of an impacting spray of air and water in a laterally extending orifice of a pitot-tube section;

producing signals representative of pressure representative of velocity of said air/water spray at said orifice by a first differential pressure transducer coupled to said pitot-tube section;

receiving and collecting volumes of water of said longitudinal flow of said air/water spray through a laterally extending opening of a rain gage section adjacent to said pitot-tube section;

producing signals representative of said volumes of water collected in said rain gage section by a second pressure differential transducer; and indicating the magnitude of dynamic force attributed to impacting air/water spray in said opening by a computer-based control/readout module connected to receive said velocity representative signals and said water volume representative signals.

15. The method of claim 14 further comprising the steps of:

orthogonally interconnecting first and second lengths of rigid tubing in said pitot-tube section; and orthogonally interconnecting horizontal and vertical capture tubes in said rain gage section.

16. The method of claim 15 further comprising the steps of:

aligning said first rigid tubing with said longitudinal flow of said air/water spray to face said orifice laterally extending across said longitudinal flow of said air/water spray; and coupling said first differential pressure transducer to said second rigid tubing for producing said velocity representative signals.

17. The method of claim 16 further comprising the steps of:

aligning said horizontal capture tube with said longitudinal flow of said air/water spray to face said opening laterally extending across said longitudinal flow of said air/water spray to receive and collect water of said air/water spray; and coupling said second pressure differential transducer to said vertical capture tube for producing said water volume representative signals.

18. The method of claim 17 further comprising the steps of:

producing said velocity representative signals corresponding to pressure at said orifice by said first pressure differential transducer; and producing said water volume representative signals corresponding to pressure in said vertical pressure tube by said second pressure differential transducer.

19. The method of claim 18 further comprising the steps of:

coupling first and second control purge signals from said computer-based control/readout module to first and second purge valves, of said pitot-tube section and rain gage section, respectively; and purging water from said pitot-tube section and said rain gage section.

20. The method of claim 19 further comprising the steps of:

speeding up the step of purging of water from said pitot-tube section with a pump in said first purge valve; and speeding up the purging of water from said rain gage section with a pump in said second purge valve.

* * * * *